United States Patent [19]

Ball

[11] Patent Number: 5,686,942
[45] Date of Patent: Nov. 11, 1997

[54] REMOTE COMPUTER INPUT SYSTEM WHICH DETECTS POINT SOURCE ON OPERATOR

[75] Inventor: James V. Ball, Santa Clara, Calif.

[73] Assignee: National Semiconductor Corporation, Santa Clara, Calif.

[21] Appl. No.: 348,031

[22] Filed: Dec. 1, 1994

[51] Int. Cl.$^6$ .................................................. G06F 3/033
[52] U.S. Cl. ............................................. 345/158; 364/559
[58] Field of Search ............................ 345/12, 157, 158, 345/159, 165, 166, 168, 145, 146, 173, 156, 163, 160, 161, 162, 164; 364/559

[56] References Cited

U.S. PATENT DOCUMENTS

| | | | |
|---|---|---|---|
| 4,301,447 | 11/1981 | Funk et al. | 345/173 |
| 4,565,999 | 1/1986 | King et al. | 345/158 |
| 4,682,159 | 7/1987 | Davison | 345/158 |
| 4,836,778 | 6/1989 | Baumrind et al. | 433/69 |
| 4,988,981 | 1/1991 | Zimmerman et al. | 345/158 |
| 5,045,843 | 9/1991 | Hansen | 345/158 |
| 5,287,119 | 2/1994 | Drumm | 345/158 |
| 5,325,133 | 6/1994 | Adachi | 345/157 |
| 5,353,042 | 10/1994 | Klapman et al. | 345/158 |
| 5,367,315 | 11/1994 | Pan | 345/158 X |
| 5,426,450 | 6/1995 | Drumm | 345/158 X |
| 5,453,759 | 9/1995 | Seebach | 345/158 |

FOREIGN PATENT DOCUMENTS

| | | | |
|---|---|---|---|
| 60-147830 | 8/1985 | Japan | 345/158 |
| 3-17696 | 1/1991 | Japan | 345/158 |

OTHER PUBLICATIONS

Gottschalk, Mark, *Optical Pointer Helps Disabled Use Computers*, Design News, Oct. 18, 1993, pp.93–94.
*What's New*, Popular Science, Oct., 1994, p. 10.

*Primary Examiner*—Mark R. Powell
*Attorney, Agent, or Firm*—Limbach & Limbach L.L.P.

[57] ABSTRACT

A computer input system for input of data to a computer from a remote location by a human operator. The computer input system includes a detecting means which remotely detects the movement of a point object, such as an operator's nose, and a processing means for converting the detected motion into an output signal. The output signal may be used by a computer to move an image within a picture on a display. The detecting means detects the motion of the point object by detecting a ray which is reflected from or radiated by the point object.

57 Claims, 3 Drawing Sheets

REMOTE COMPUTER INPUT SYSTEM WHICH DETECTS POINT SOURCE ON OPERATOR

BACKGROUND OF THE INVENTION

1. Field of the Invention

The present invention relates to a computer input system. More specifically, the present invention relates to a computer input system which allows a person to input information to a computer by remote detection of motion of a point object.

2. Background Art

In many computer applications, a human operator must input data into the computer. For instance, some computer programs require the operator to enter text or numbers. Many computer programs require the user to move images or position objects within successive pictures shown on a display. Such moving images or positionable objects are found in programs where icons are selected by a movable cursor to direct program flow, video games, computer-aided design programs and the like. Another example of a moving image is found in programs where a line is drawn on the display according to position data input by the operator.

There are several known devices which allow a person to input data into a computer. Buttons and sets of buttons, such as a keyboard, allow an operator to input data to a computer by selectively pressing the buttons. This type of input device works well for many applications, such as text entry.

However, buttons may not be the optimum input device for other types of input, such as input used to position an object on a display. For instance, in some devices different buttons may be pressed to move an image in different directions and/or at different velocities. However, while more direction or velocity buttons allow more options with respect to movement of the image, the buttons take up space. Furthermore, even with relatively few buttons, it can be difficult to effect precise movement of the on-screen image due to difficulty in precisely co-ordinating hand manipulation of the buttons. In some applications, the operator may want to quickly switch between moving an image on the display and other input tasks which require hand manipulation, such as text entry. In this case, the operator must move and position the hands over different sets of buttons, which can slow the data input. Also, the operation of buttons may lead to repetitive movement ailments in the arms or hands of the operator.

Another data input device is the joystick. A joystick is a lever which the operator can move in a direction corresponding to the direction in which an image is to be moved. However, many joysticks are limited in the number of directions and/or velocities which can be effected. There are also limitations similar to those discussed above in connection with data input by buttons. Namely, these are hand co-ordination difficulties, decreased freedom to use the hands for other input tasks, and the possibility of repetitive movement ailments.

Another data input device is the mouse. Mouse input devices allow the operator to move an image on the display by sliding the mouse over a surface. Mouse input devices are subject to hand co-ordination difficulties, decreased freedom to use the hands for other tasks, and the possibility of fatigue of the hands or arms. Mouse input devices are also subject to problems of contamination and wear due to the fact that they are in sliding contact with a surface. Mouse input devices also take up a relatively large amount of space because there must be space for the surface over which the mouse input device slides.

SUMMARY OF THE INVENTION

In accordance with the present invention, a computer input system, for the input of information to a computer by a human operator, includes a detecting means and a processing means. The detecting means detects movement of a point object from a remote location (as used herein, the word "remote" means separated in space). This remote detection can be accomplished by detecting a ray (such as a ray of visible light) which is reflected by the point object. This remote detection can also be accomplished by detection of a ray of infrared radiation which is radiated by an operator's body. The detected movement may entail detection of position, velocity, acceleration or other characteristics of motion of the point object. The processing means converts the movement detected by the detecting means into an output signal. This output signal can be sent to a computer as input data.

In accordance with another aspect of the present invention, a computer input system includes a computer, a display and the detecting means and processing means described above. The computer successively generates pictures which contain an image. These pictures are shown on the display.

In accordance with a further aspect of the present invention, there is a method of inputting data to computer by a human operator which includes the steps of remotely detecting the motion of a point object and converting the motion of the point object into an output signal. The point object may be, for example, the tip of the operator's nose. Alternatively, the point object may be, for example, a reflective spot mounted on the operator's face.

In the above described method of inputting data to a computer, the output signal can be sent to a computer which generates successive pictures, which contain an image, for displaying on a display. These pictures are generated so that the location of the image within the picture corresponds to the detected motion of the point object.

A better understanding of the features and advantages of the present invention will be obtained by reference to the following detailed description and accompanying drawings which set forth illustrative embodiments in which the principles of the invention are utilized.

DETAILED DESCRIPTION OF THE PREFERRED EMBODIMENTS

Figure 1:
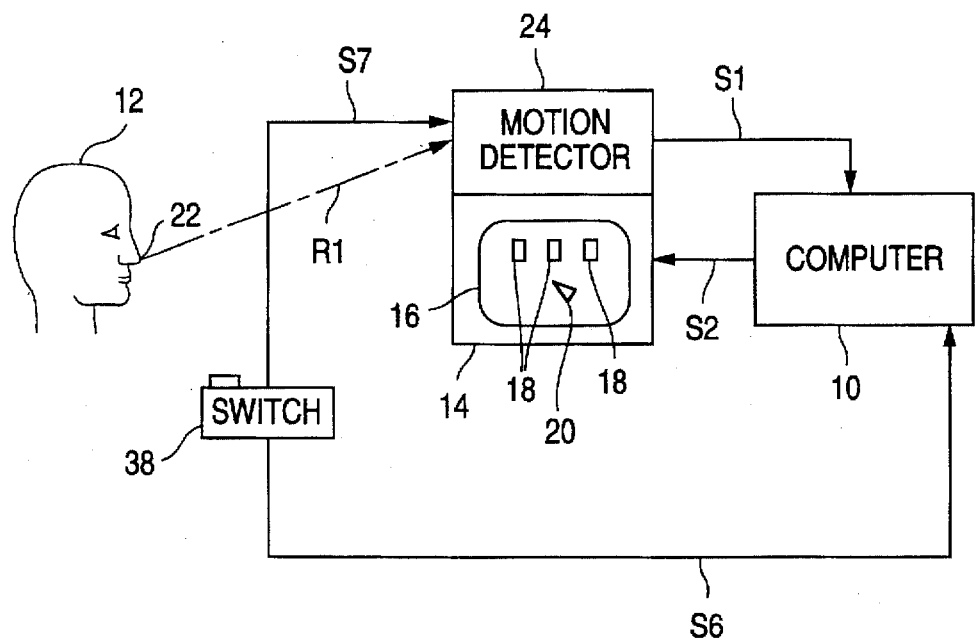
FIG. 1 shows an embodiment of a computer input system according to the invention.

FIG. 1 shows a computer input system where information can be input to a computer 10 by a human operator 12. The computer 10 may be, for example, a general purpose personal computer or some type of specialized computer such as a computer-aided design work-station. The computer 10 successively generates pictures to be shown on the screen 16 of a display 14. The pictures are sent from the computer 10 to the display 14 by the signal S2. The display 14 may be, for example, a cathode ray tube display, a computer monitor, a liquid crystal display, or the like. The display 14 has a rectangular screen 16 which displays the pictures sent from the computer 10.

The picture shown in FIG. 1 contains several images 18, 20 within the picture. The images denoted by reference numeral 18 are icons which represent the different options for directing flow of the program running on the computer 10. The image denoted by reference numeral 20 is a cursor which is used as a pointer. The motion of the cursor 20 within the picture can be controlled by the operator 12 to point to and thereby select among the icons 18.

According to the embodiment shown in FIG. 1, the cursor is controlled to correspond to the motion of the tip of the nose 22 of the operator. The tip of the nose 22 is one example of a point object as that term is used herein. It is thought that by controlling the motion of a moving image, such as a cursor 20, to correspond to a point object on or mounted on the face of the operator 12, the operator 12 may effect precise, accurate and comfortable control of the moving image.

The motion of the nose 22 of the operator 12 is detected by a motion detector 24. Possible specific embodiments for the motion detector 24 will be discussed below. The motion detector 24 is mounted on the display 14. It should be noted that the motion detector 24 detects motion remotely. It is separated in space and not touching the nose 22 of the operator. Information about the motion of the nose 22 is conveyed across the space between the nose 22 and the motion detector by the ray R1. This arrangement allows the head, hand and the rest of the body of the operator to remain relatively unencumbered by motion detecting hardware. The motion detector 24 converts the detected motion of the nose 22 and converts it into an output signal S1 which is sent to the computer 10.

The motion of the nose 22 which is detected may include position, velocity, acceleration or other characteristics of motion. For example, the signal S1 may correspond to the positional change of the nose 22 over a specified time interval in a three dimensional co-ordinate system defined relative to the motion detector 24. The motion of the cursor 20 can then be controlled so that the positional change of the cursor 20 corresponds in direction and magnitude to the positional change of the nose 22 as projected on a plane (not shown) within the three dimensional co-ordinate system.

Alternatively, the velocity of the nose might be detected. In this case, the positional change of the cursor 20 can be controlled to correspond to the direction and magnitude of the detected velocity of the nose 22. Of course, there are many different ways to translate characteristics of the motion of the nose 22 into motion of a moving image, such as a cursor 20, and the above described examples are for illustrative purposes. Optimally, the motion of the nose 22 should control the cursor 20 in a precise, accurate, natural and comfortable manner which does not require the operator 12 to break visual contact with the screen 16.

For many applications, it is thought that the operator 12 can most naturally control the motion of a moving image when the direction of motion of the moving image is the same as the direction of motion of the nose 22. However, the motion of the moving image may correspond to the motion of the nose 22 in other ways. For example, if the moving image is a horizon line in a flight simulation program, it might seem more natural for the horizon line to move upwards when the nose moves downwards in order to simulate the apparent motion of the horizon when viewed directly from an aircraft.

FIG. 1 also shows a switch 38. The switch 38 may be, for example, a button on a keyboard, a foot-switch, a lever or the like. The switch 38 may be in one of two conditions, ON or OFF. The switch will output its condition to the computer 10 by the signal S6 and to the motion detector by the signal S7. The switch 38 allows the operator to enable or disable the functioning whereby the motion of the cursor 20 corresponds to motion of the nose 22. In this way the cursor 20 will not be moving around the screen 16 (in a potentially distracting manner) when the operator 12 is working on tasks other than positioning of the cursor 20.

Alternatively, a predetermined condition of the switch (i.e. OFF) may disable the detection of motion by the motion detector, the conversion of the detected motion into an output signal by the motion detector, or the receipt or processing of the output signal S1 by the computer 10.

Figure 2:
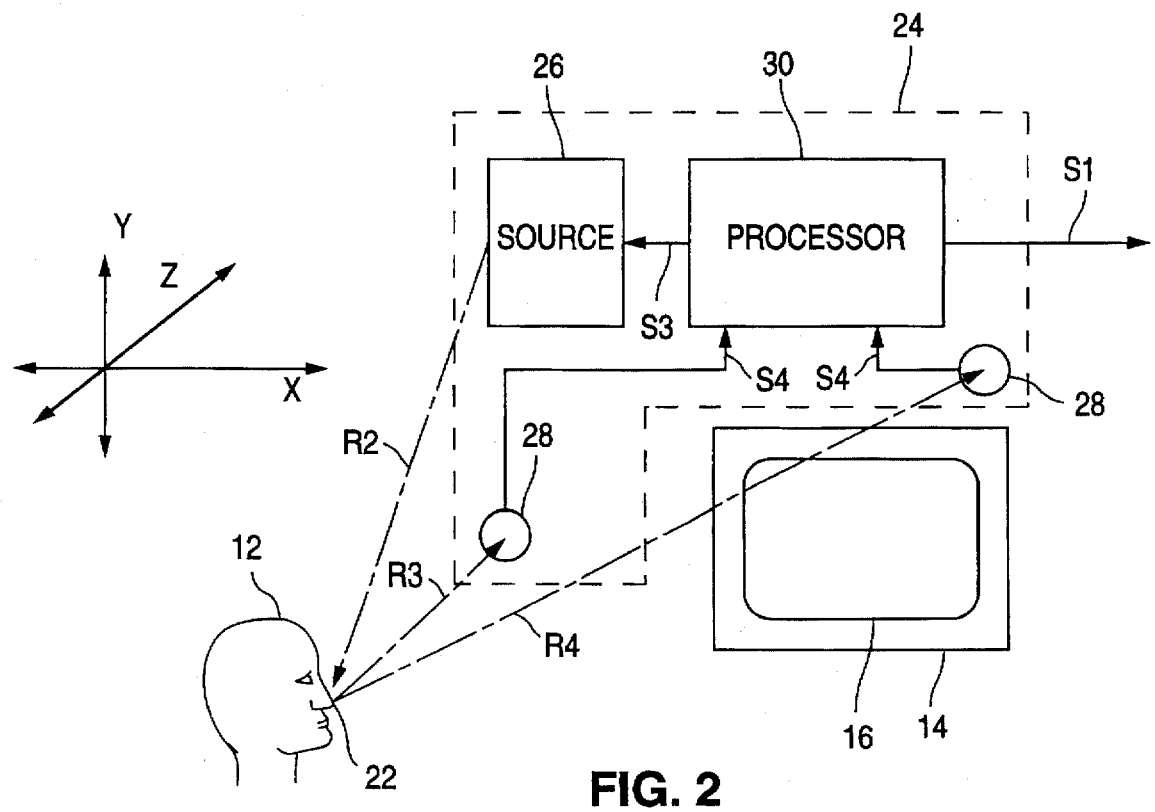
FIG. 2 shows an embodiment of a computer input system according to the invention.

FIG. 2 shows an embodiment of the computer input device of the present invention in which elements similar to those discussed in connection with FIG. 1 are denoted by the same reference numerals. The motion detector 24 in this embodiment includes a source 26. The source 26 may emit rays R2 of electromagnetic radiation such as infrared radiation, visible light, or electromagnetic radiation of other wavelengths. The source 26 may be a laser. The source 26 may be a scanning laser which changes the angle over which the rays R2 are emitted over time in a scanning fashion. Alternatively, the source 26 may emit rays R2 which are in the form of ultrasonic waves. Rays R2 from the source should irradiate or otherwise be incident on the nose 22. Care must be taken that the rays R2 are of such a form and intensity so that the operator 12 will not suffer discomfort or ill health effects from exposure to the rays R2.

The rays R2 are reflected as rays R3, R4 back to sensing elements 28. The sensing elements 28 detect the motion of the nose 22 based on the reflected rays R3, R4. The motion of the nose may be detected based on, for example, the timing at which the reflected rays R3 and R4 are detected, the intensity of the reflected rays R3, R4, the location of the reflected rays R3, R4 on the sensing elements 28, or the frequency of the reflected rays R3, R4. In the embodiment shown in FIG. 2, there are two sensing elements 28 located over 1 centimeter apart from each other so that the position of the nose 22 can be calculated by triangulation. The tip of the nose 22 is a good point object for detection by the motion detector 24, because it will often be the closest point to the motion detector 24, which can simplify analysis of the information conveyed by the reflected rays R3, R4.

It should be noted that some embodiments of the present invention will not require a source 26 to generate rays R2 for reflection by the point object. For instance, some embodiments rely on reflection of ambient rays, such as ambient rays of visible light. Also, some embodiments may utilize rays of infrared radiation which are radiated by (rather than reflected from) the body of the operator 12.

The sensing elements 28 may be constructed as photodiodes which generate an electric signal proportional to the intensity of visible light. Alternatively, the sensing elements 28 may be constructed as an array containing a plurality of photodiodes. One example of a sensing element 28 which generally employs an array of photodiodes is a conventional charge-coupled device (CCD) image array. If the sensing elements 28 are constructed as constructed as photodiodes then there may be embodiments where the operator 12 would mount a reflective spot on the face, for instance by means of eyeglasses bearing such a reflective spot. Because the reflective spot, having some predetermined level of reflectivity would reflect rays R3, R4 at a higher or different intensity than the rest of the face, this point object would be easy to detect. For instance the reflective spot would show up as a bright spot, or predetermined pattern, on output data from an array of photodiodes.

The sensing elements 28 may be constructed as infrared radiation sensors. As mentioned above, because the human body radiates infrared radiation, this type of sensing element 28 may make a source 26 (i.e. of infrared radiation) unnecessary in this embodiment of the invention. Also, the sensing elements 28 could be constructed as an array of infrared sensor elements. Many auto-focussing systems in 35 millimeter cameras employ infrared radiation sources and detectors.

The sensing elements 28 may be constructed as ultrasonic sensors, such as electrostatic transducers. In this case, the ultrasonic sensors may be constructed to detect the timing at which reflected rays R3, R4 (an echo) are sensed relative to the timing at which ultrasonic waves R2 are sent from the source 26. It should be noted that the source 26 and sensor 28 may be built as a unified electrostatic transducer in this embodiment. Autofocussing systems for 35 millimeter cameras have been constructed which employ ultrasonic wave generators and ultrasonic sensors.

FIG. 2 shows a processor 30 which receives signals S4 output by the sensors 28. The processor uses these signals S4 to calculate and generate an output signal S1. The calculations performed will depend heavily on the construction and output of the sensors 28. For instance, the processor may perform triangulation calculations which rely on the differences between the output signals S4. Alternatively, processor 30 may perform processing to locate the nose 22 within image data representing a larger "picture" output from the sensor 28. In other words, the processor 30 may perform calculations to locate a bright spot or predetermined pattern in a signal S4, which contains image data representing a larger "picture" sent from the sensor 28 (such a photodiode array or a CCD image array).

For instance, if such a "picture" is infra-red image data, which comes from an array of infrared sensor elements, then the nose 22 may show up as a dark spot within a brighter area. The dark spot indicates a relatively low level of detected infrared radiation. The bright area surrounding the dark spot indicates a relatively high level of detected infra-red radiation. The nose 22 shows up a dark spot surrounded by a brighter area because the nose 22 has a lower temperature, and therefore emits less infrared radiation than the rest of the face. The location of this predetermined pattern within the infrared-image data will therefore correspond to the position of the operator's nose.

The processor 30 may calculate some characteristic of the detected motion based upon a directly detected characteristic. For instance, velocity may be detected based on successive detected positions of the point object. The processor 30 may include a clock (not shown) for measuring the timing of received signals S4. The processor 30 may include a memory (not shown) to allow storage of a multiplicity of detected positions, velocities, etc.

The motion detector 24 shown in FIG. 2 detects motion in the orthogonal X and Y directions as shown in FIG. 2. The X direction corresponds to the horizontal direction on the rectangular screen 16 and the Y direction corresponds to the vertical direction on the rectangular screen 16. The motion detecting device is rigidly connected to the display device 14 so that the sensors 28 can always detect motion relative to the same co-ordinate system as the screen 16. Note that it may only be necessary to detect motion in the X and Y directions in many applications wherein the moving image, such as a cursor 20, needs to be shown as moving in only two dimensions, e.g. the plane of the screen 16. Sometimes it may be useful to detect motion in the Z direction (as shown in FIG. 2) which is orthogonal to the X and Y directions. Detection of motion in the Z direction may be useful, for example, for moving images within pictures which simulate a three dimensional display. Detection of motion in the Z direction may also be useful moving the moving image in a natural and comfortable way while accounting for pivotal motion of the head of the operator 12.

Figure 3:
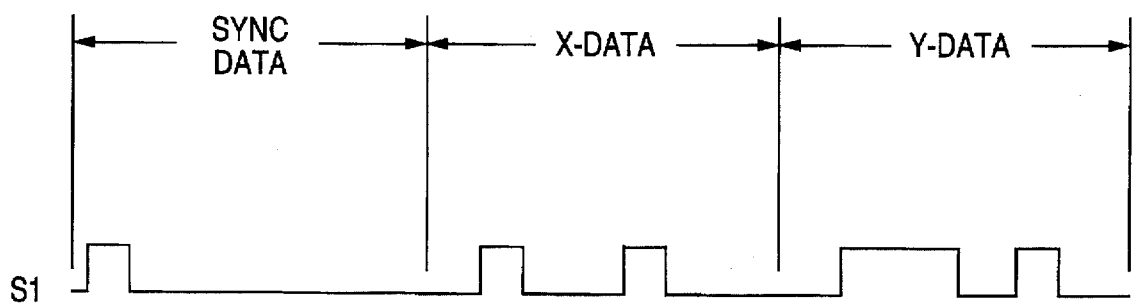
FIG. 3 shows a serial output signal S1 which is output by detecting means in an embodiment of the invention.

The output signal S1, output by the processor 30 may be a serial or parallel signal. FIG. 3 shows an illustrative serial signal S1. This signal S1 has cycles made up of a sync data window, an X-data window and a Y-data window. The sync data may have the form of a predetermined pattern of bits which allow a computer 10 to lock onto and correctly interpret the following bit patterns. The X-data area represents detected movement (i.e. position, velocity, etc.) along the X direction. The Y data area represents detected movement along the Y direction. Of course, many serial data protocols are possible. It may be useful to select a protocol which is compatible with other existing input devices such as mouse input devices.

Figure 4:
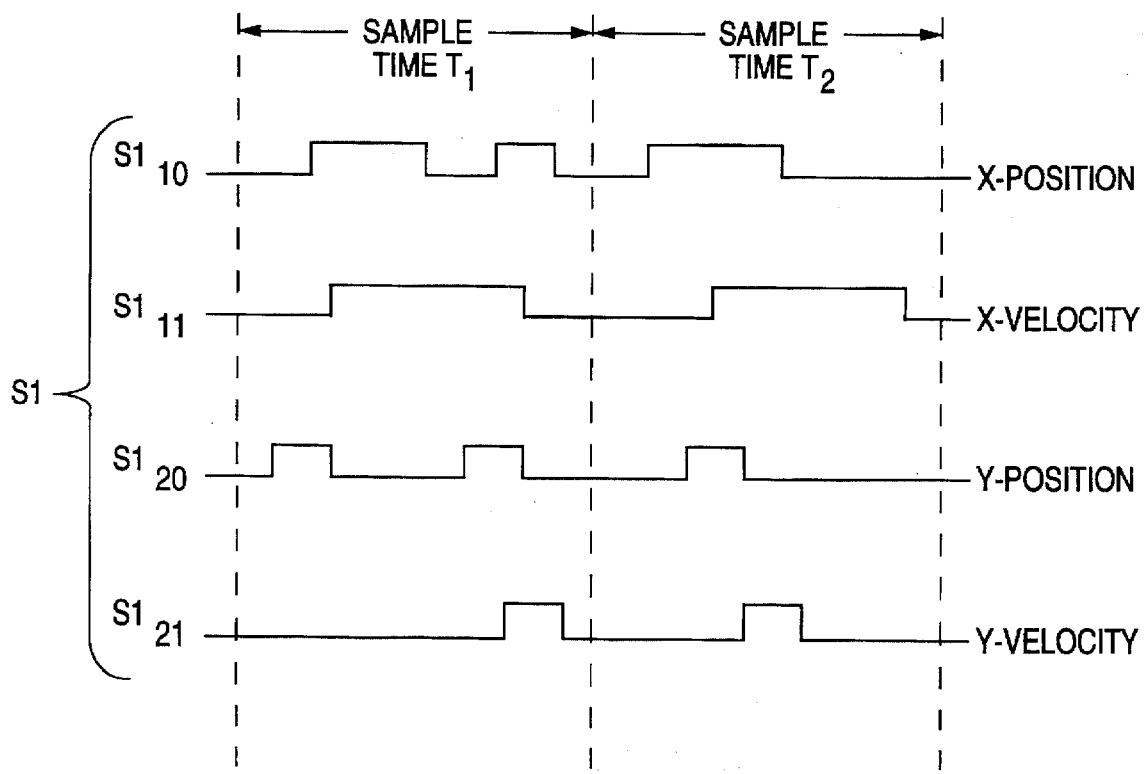
FIG. 4 shows a parallel output signal S1 which is output by detecting means in another embodiment of the invention.

FIG. 4 shows an illustrative parallel output signal S1 which includes four parallel signals $S1_{10}$, $S1_{11}$, $S1_{20}$ and $S1_{21}$. Signal $S1_{10}$ is made up of a bit pattern which represents the position of the point object along the X direction at sample time T1 and then at sample time T2. Signal $S1_{11}$ is made up of a bit pattern which represents the velocity of the point object along the X direction at sample time T1 and then at sample time T2. Signal $S1_{20}$ is made up of a bit pattern which represents the position of the point object along the Y direction at sample time T1 and then at sample time T2. Signal $S1_{21}$ is made up of a bit pattern which represents the velocity of the point object along the Y direction at sample time T1 and then at sample time T2. The parallel signal S1 shown in FIG. 4 may comprise other parallel signals such as ground signals. The protocol for parallel signals may be designed to be compatible with those of existing input devices, such as existing 9-pin pin-outs used for mouse input devices.

Figure 5:
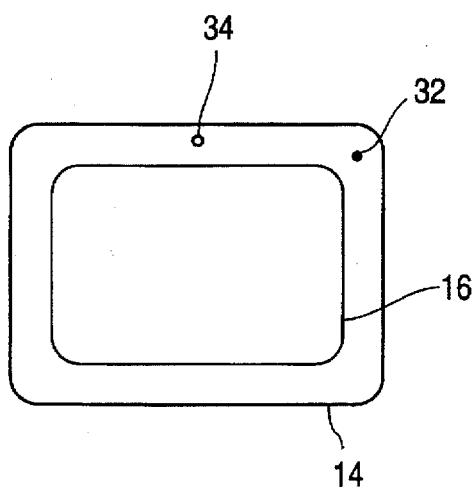
FIG. 5 shows a first embodiment of a display with a sensing element built into the periphery.
Figure 6:
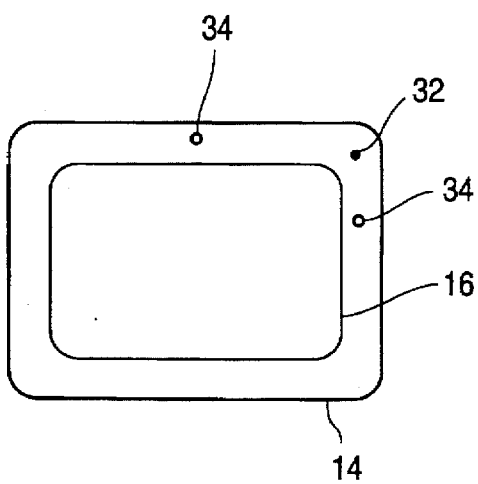
FIG. 6 shows a second embodiment of a display with a sensing element built into the periphery.
Figure 7:
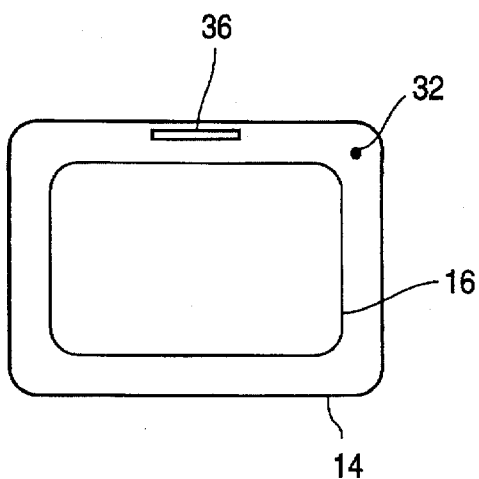
FIG. 7 shows a third embodiment of a display with a sensing element built into the periphery.

Apertures to accommodate the source 26 and/or sensing elements 28 are preferably built along the periphery 32 of a display 14 as shown in FIGS. 5–7. These apertures may be actual openings, or they may be covered with any material which transmits the type of rays R1, R2, R3, R4 utilized by the computer input system. FIG. 5 shows a single circular aperture along the periphery 32 of the display 14. This configuration is thought to be useful for systems where the sensing element utilizes a charge-coupled device. FIG. 6 shows two circular apertures 34 built into the periphery 32 of the rectangular display 14 along two adjacent sides of the rectangular display. This configuration is thought to be useful in systems where the motion is detected by triangulation (i.e. infrared or ultrasonic triangulation motion detectors). FIG. 7 shows a rectangular aperture 36 built into the periphery 32 of the display 14. This configuration is thought to be useful in systems which employ a scanning laser. The relatively large aperture allows the laser to scan across a greater range of angles.

While the embodiments described above have been largely described with reference to a system where the moving image is a cursor which follows the movement to the tip of the nose, many variations are possible. For instance, the point object may be any point object whose motion is controlled by a human operator. The moving image may be a line which is drawn on the screen, a video game character or any other type of image which the operator conventionally moves within a picture while using a computer program. In fact, there may not be a moving image at all. For instance there may be applications where the motion of the point object are controlled to correspond to some type of sign language convention which conveys input data to a computer, without necessarily being shown as part of a moving image on the display.

It is to be understood that the present invention is not limited to the above described embodiments, and that various changes and modifications could be effected by one skilled in the art without departing from the spirit or scope of the invention as defined in the appended claims.

What is claimed is:

1. A computer input system for the input of information to a computer by operator, the computer input device comprising:
   detecting means for remote detection of a movement of a point object which is closest to the detecting means by detection of a ray reflected from the point object; and
   processing means for converting the movement detected by the detecting means into an output signal; and
   a display for displaying pictures successively generated by the computer, with the detecting means being mounted on the display.

2. A computer input system according to claim 1, wherein the detecting means includes means for detecting movement of the point object by detecting at least the position of the point object.

3. A computer input system according to claim 1, wherein the detecting means includes means for detecting movement of the point object by detecting at least the velocity of the point object.

4. A computer input system according to claim 1, wherein the detecting means includes means for detecting movement of the point object by detecting at least the acceleration of the point object.

5. A computer input system according to claim 1, wherein the detecting means comprises a sensor for detecting electromagnetic radiation, and the reflected ray detected by the detecting means is a ray of electromagnetic radiation.

6. A computer input system according to claim 5, wherein the sensor detects the movement of a point object which exhibits a predetermined level of reflectivity with respect to the electromagnetic radiation detected by the detecting means.

7. A computer input system according to claim 5, wherein the detecting means further comprises an electromagnetic radiation source for irradiating the point object, so that the ray comes from the electromagnetic radiation source.

8. A computer input system according to claim 7, wherein the electromagnetic radiation source is a laser.

9. A computer input system according to claim 7, wherein the electromagnetic radiation source is a scanning laser.

10. A computer input system according to claim 5, wherein the detecting means comprises a visible light sensor for detecting a ray of visible light reflected by the point object.

11. A computer input system according to claim 10, wherein the visible light sensor comprises an array of photodiodes.

12. A computer input system according to claim 10, wherein the visible light sensor comprises at least two sensor elements which are disposed at least 1 centimeter apart from each other and the processing means includes means for calculating the motion of the point object by triangulation utilizing signals generated by the at least two sensors.

13. A computer input system according to claim 10, wherein the visible light sensor comprises a charge-coupled device image array.

14. A computer input system according to claim 5, wherein the sensor comprises an infrared sensor, and the reflected ray detected by the detecting means is a ray of infrared radiation.

15. A computer input system according to claim 14, wherein the infrared sensor comprises at least two infrared sensor elements which are disposed at least 1 centimeter apart from each other and the processing means includes means for calculating the motion of the point object by triangulation utilizing signals generated by the at least two sensors.

16. A computer input system according to claim 1, wherein the detecting means comprises:
   an ultrasonic wave generator for emitting ultrasonic waves; and
   an ultrasonic sensor for detecting the position of the point object based on detection of the reflected ray, with the reflected ray being an ultrasonic wave emitted from the ultrasonic wave generator which has been reflected by the point object.

17. A computer input system according to claim 16, wherein the ultrasonic sensor comprises at least two sensing elements which are disposed at least 1 centimeter apart from each other and the processing means includes means for calculating the motion of the point object by triangulation utilizing signals generated by the at least two sensors.

18. A computer input system according to claim 1, wherein the processing means calculates movement of the point object along a first direction, calculates movement of the point object along a second direction orthogonal to the first direction, and generates the output signal at a level determined on the basis of the calculated movement in the first and second directions.

19. A computer input system according to claim 18, wherein the level of the output signal is serially determined on the basis of movement in the first direction and movement in the second direction.

20. A computer input system according to claim 18, wherein the output signal is comprised of at least two parallel signals.

21. A computer input system according to claim 20, wherein at least one of the parallel signals has a level determined on the basis of movement in the first direction and at least one of the parallel signals has a level determined on the basis of movement in the second direction.

22. A computer input system according to claim 1, wherein the detecting means comprises a sensor disposed along the periphery of the display.

23. A computer input system according to claim 1, wherein the display has rectangular shape and the detecting means comprises at least two sensors which are respectively disposed along two adjacent sides of the periphery of the display.

24. A computer input system according to claim 1, wherein the computer utilizes the output signal of the processing means to generate successive pictures so that location of an image contained in the successive pictures is moved corresponding to the movement of the point object.

25. A computer input system according to claim 24, wherein the image is a cursor which is used to select icons on the display.

26. A computer input system according to claim 1 further comprising a switch which can be switched between at least a first condition and a second condition by the operator to enable and disable the computer input system.

27. A computer input system according to claim 26 further comprising a keyboard with a plurality of buttons, so that the switch can be switched by depressing a predetermined combination of buttons of the plurality of buttons.

28. A computer input system according to claim 26, wherein the detecting means only detects movement of the point object when the switch is in the first condition.

29. A computer input system according to claim 26, wherein the computer only receives the output signal from the processing means when the switch is in the first condition.

30. A computer input system according to claim 26, wherein the processing means only converts detected movement of the point object when the switch is in the first condition.

31. A method of inputting data to a computer by an operator comprising the steps of:

detecting a ray reflected from a point object which is a tip of a nose of the operator; and generating an output signal corresponding to motion of the point object based on the detected reflected ray.

32. A method of inputting data to a computer according to claim 31, wherein the point object is a reflective spot mounted on the nose of the operator.

33. A method of inputting data to a computer according to claim 31, wherein the reflected ray is a ray of ambient visible light reflected from the point object.

34. A method of inputting data to a computer according to claim 31 further comprising the steps of:

irradiating the point object with a ray of electromagnetic radiation; and reflecting of the ray of electromagnetic radiation by the point object.

35. A method of inputting data to a computer according to claim 34, wherein the point object is irradiated by a laser.

36. A method of inputting data to a computer according to claim 34, wherein the point object is irradiated by a scanning laser.

37. A method of inputting data to a computer according to claim 31, further comprising the steps of:

irradiating the point object with a ray of infrared radiation; and reflecting of the ray of infrared radiation by the point object.

38. A method of inputting data to a computer according to claim 31 further comprising the steps of:

generating an ultrasonic wave which is directed toward the point object; and reflecting of the ultrasonic wave by the point object.

39. A method of inputting data to a computer according to claim 31 further comprising the steps of:

generating successive pictures, which contain at least one image, so that the location of the image within the picture corresponds to the detected motion of the point object; and displaying the successive pictures on a display.

40. A method of inputting data to a computer according to claim 39, wherein the image is a cursor used to select among icons on the display.

41. A method of inputting data to a computer according to claim 39, further comprising the steps of:

determining whether a switch, which is operated by the operator, is in a predetermined condition; and generating the successive pictures so that the location of the image corresponds to the detected motion of the point object only when the switch is in the predetermined condition.

42. A computer input system for the input of information to a computer by an operator, the computer input device comprising:

a computer;

a display for displaying pictures successively generated by the computer;

detecting means for remote detection of movement of a point on the body of the operator by detection of a ray of infrared radiation which is generated at and radiates from the point on the body of the operator, with the detecting means being mounted on the display; and processing means for converting the movement detected by the detecting means into an output signal.

43. A computer input system according to claim 42, wherein the detecting means comprises an array of infrared sensor elements.

44. A computer input system according to claim 43, wherein the detecting means includes means for outputting infrared-image data corresponding to the amount of infrared radiation detected by each of the infrared sensor elements of the array of infrared sensor elements to the processing means, and the processing means includes means for processing the infrared-image data in order to determines a position of the point on the body of the operator.

45. A computer input system according to claim 44, wherein the processing means processes the infrared-image data by locating a predetermined pattern within the infrared-image data, where the predetermined pattern corresponds to the position of the point on the body of the operator.

46. A computer input system according to claim 45, wherein the predetermined pattern corresponds to infrared-image data with a first area exhibiting a relatively low level of detected infrared radiation surrounded by a second area exhibiting a higher level of detected infrared radiation, where the first area corresponds to the position of a nose on the body of the operator.

47. A computer input system according to claim 42, wherein the detecting means comprises an infrared sensor disposed along the periphery of the display.

48. A computer input system according to claim 42, wherein the computer utilizes the output signal of the processing means to generate successive pictures so that location of an image contained in the successive pictures is moved corresponding to the movement of the point object.

49. A computer input system according to claim 48, wherein the image is a cursor which is used to select among icons on the display.

50. A computer input system according to claim 42 further comprising a switch which can be switched between at least a first condition and a second condition by the operator.

51. A computer input system according to claim 50 further comprising a keyboard with a plurality of buttons, so that the switch can be switched by depressing a predetermined combination of buttons of the plurality of buttons.

52. A computer input system according to claim 50, wherein the detecting means will only detect movement of the point object when the switch is in the first condition.

53. A computer input system according to claim 50, wherein the computer will only receive the output signal from the processing means when the switch is in the first condition.

54. A computer input system according to claim 50, wherein the processing means will only convert detected movement of the point object when the switch is in the first condition.

55. A method of inputting data to a computer by an operator comprising the steps of:

detecting an infrared ray which is radiated from a point on the body of the operator; and generating an output signal corresponding to motion of the point on the body of the operator based on the detected infrared ray.

56. A computer input system for the inputting information to a computer by an operator, the computer input device comprising:

detecting means for remote detection of a movement of a point object by detection of a ray reflected from the point object;

processing means for converting the movement detected by the detecting means into an output signal;

a display for displaying pictures successively generated by the computer, the detecting means being mounted on the display; and wherein the detecting means includes means for detecting the movement of the point object by detecting a tip of a nose of the operator who is positioned at a location suitable for observing the display.

57. A method of inputting data to a computer by an operator comprising the steps of:

detecting, by a detecting means, a point object which is closest to the detecting means by detection of a ray reflected from the point object; and generating an output signal corresponding to motion of the point object based on the detected reflected ray.

* * * * *